United States Patent [19]

Neki

[11] Patent Number: 4,984,189

[45] Date of Patent: Jan. 8, 1991

[54] DIGITAL DATA PROCESSING CIRCUIT EQUIPPED WITH FULL BIT STRING REVERSE CONTROL CIRCUIT AND SHIFTER TO PERFORM FULL OR PARTIAL BIT STRING REVERSE OPERATION AND DATA SHIFT OPERATION

[75] Inventor: Katsuhiko Neki, Tokyo, Japan

[73] Assignee: NEC Corporation, Tokyo, Japan

[21] Appl. No.: 847,415

[22] Filed: Apr. 3, 1986

[30] Foreign Application Priority Data

Apr. 3, 1985 [JP] Japan ................. 60-70230

[51] Int. Cl.[5] .................. G11C 19/00; G06F 5/00; G06F 15/332
[52] U.S. Cl. .................. 364/900; 377/69; 377/70; 364/715.08; 364/947.6
[58] Field of Search ... 364/200 MS File, 300 MS File, 364/900 MS File, 715, 726, 725, 727; 377/69, 70, 71, 72, 73, 74

[56] References Cited

U.S. PATENT DOCUMENTS

| | | | |
|---|---|---|---|
| 3,673,399 | 6/1972 | Hanoke et al. | 364/726 |
| 3,721,812 | 3/1973 | Schmidt | 364/726 |
| 3,731,284 | 5/1973 | Thies | 364/726 |
| 3,816,729 | 6/1974 | Works | 364/726 |
| 3,875,391 | 4/1975 | Shapiro et al. | 364/200 |
| 3,961,750 | 6/1976 | Dag | 235/164 |
| 4,051,357 | 9/1977 | Bonnerot | 364/726 |
| 4,159,528 | 6/1979 | Perry | 364/726 |
| 4,168,396 | 9/1979 | Best | 364/200 |
| 4,181,976 | 1/1980 | Collins et al. | 364/726 |
| 4,231,102 | 10/1980 | Barr et al. | 364/726 |
| 4,278,837 | 7/1981 | Best | 364/900 |
| 4,282,581 | 8/1981 | Bondurant et al. | 364/737 |
| 4,298,950 | 11/1981 | Smith, Jr. | 364/726 |
| 4,328,555 | 5/1982 | Nussbaumer | 364/726 |
| 4,383,304 | 5/1983 | Hirashima | 364/715 |
| 4,396,994 | 8/1983 | Kang et al. | 364/900 |
| 4,465,901 | 8/1984 | Best | 364/200 |
| 4,472,788 | 9/1984 | Yamazaki | 364/900 |
| 4,475,173 | 10/1984 | Talmi | 364/900 |
| 4,534,009 | 8/1985 | McGee | 364/900 |
| 4,583,197 | 4/1986 | Chappell et al. | 364/900 |
| 4,598,170 | 7/1986 | Piosenka et al. | 178/22.08 |
| 4,636,976 | 1/1987 | Takla | 364/900 |
| 4,653,019 | 3/1987 | Hodge et al. | 364/900 |
| 4,665,538 | 5/1987 | Machida | 377/69 |
| 4,785,421 | 11/1988 | Takahashi et al. | 364/715.01 |

FOREIGN PATENT DOCUMENTS 0170493 2/1986 European Pat. Off.

OTHER PUBLICATIONS

T. E. Gersbach, "High-Speed Shifter Array", IBM Technical Disclosure Bulletin, vol. 21, No. 4 (Sep. '78), pp. 1379-1380.
Signetics Logic-TTL Data Manual, 1st Ed., San Francisco, Uniplan Publishers, 1978, pp. 238-240.
Gschwind et al., "Design of Digital Computers", Springer-Verlag, New York (1975), pp. 116, 117.
English-Translation of Japanese Published Abstract 59-33575(A) (1984).

Primary Examiner—Thomas C. Lee
Assistant Examiner—Robert B. Harrell
Attorney, Agent, or Firm—Sughrue, Mion, Zinn, Macpeak & Seas

[57] ABSTRACT

A data processing circuit having a bit reverse function and including a bit reverse circuit which reverses a bit string of data and a shifting circuit which shifts the data with the reversed bit string such that a part of the bit string or arbitrary bits of the data may be selectively reversed according to an information representing bits to be reversed.

4 Claims, 2 Drawing Sheets

DIGITAL DATA PROCESSING CIRCUIT EQUIPPED WITH FULL BIT STRING REVERSE CONTROL CIRCUIT AND SHIFTER TO PERFORM FULL OR PARTIAL BIT STRING REVERSE OPERATION AND DATA SHIFT OPERATION

BACKGROUND OF THE INVENTION

1. Field of the Invention

The present invention relates to a digital data processing circuit having a bit reverse function, and more particularly to a digital data processing circuit suitable for a digital signal processor having a fast Fourier transform (FFT) function.

2. Description of the Background Art

When a discrete Fourier transform (DFT) is performed by a digital signal processor, an FFT algorithm is usually employed. In order to perform an FFT, the order of a bit string of data to be processed has to be reversed. The data to be processed is usually stored in a memory. To reverse the order of the bit string, the data is read out of the memory and is processed by a software program, or by a hardware circuit. It is important to reverse the order of the bit string at high speed in order to enhance the performance of the digital signal processor.

Various techniques have been proposed for effecting bit reversal. For example, it has been known to use a table memory for preliminarily storing data having a reversed bit string. The stored data having the reversed bit string are read out of the table memory as needed. This technique, however, requires a large amount of memory and is unsuitable for a small size signal processor chip. Therefore, a hardware circuit to reverse the bit string has been employed effectively in the signal processor chip.

Another proposed bit reversal technique employs a plurality of switching gates inserted between a bus and a register. A bit string of data in the register is reversed and derived from the register via the switching gates. Thus, the bit reverse operation can be performed at a high speed without a large amount of memory. However, such a bit reverse circuit cannot reverse a part of the bit string selectively. In other words, only a full bit string or a fixed bit string may be reversed. Therefore, when it is necessary to perform a bit reverse operation for a part of data or for arbitrary bits of data within a bit string, this bit reverse circuit is insufficient.

SUMMARY OF THE INVENTION

In view of the foregoing defects, it is an object of the present invention to provide a data processing circuit having a bit reverse function of a part or arbitrary bits of a bit string.

Another object of the present invention is to provide a data processing circuit suitable for a signal processor having an FFT function.

A data processing circuit having a bit reverse function according to the present invention comprises a bit reverse circuit which reverses a full bit string of data or a fixed part of a bit string of data, and a shifting circuit coupled to the bit reverse circuit through a bus. The bit reverse circuit includes a register and a plurality of switching gates for reversing the full bit string or a fixed part of a bit string. The shifting circuit receives the data having a reversed bit string and shifts the received data rightwardly or leftwardly according to a required shift value. Thus, both a full bit string or a fixed part of a bit string and a part of a bit string or arbitrary bits of a bit string can be easily reversed at high speed.

Further, in the shifting operation, the bit or bits shifted out rightwardly (or leftwardly) may be returned to the left (or the right) of the bit string. In order to attain this shift operation, a plurality of switching transistors arranged in a matrix is provided between an input end of the shifting circuit and an output end thereof. Switching transistors arranged in a matrix are divided into a plurality of groups, each of which has the same number of transistors. One of the groups is selected, and all transistors in the selected group are turned on according to a control signal generated by decoding the shift value. Thus, a data in which a full (or fixed) bit string or a part of a bit string or arbitrary bits of a bit string are reversed can be derived from the output end of the shifting circuit with a simple circuit having a small number of transistors.

BRIEF DESCRIPTION OF THE DRAWINGS

One embodiment of the invention now will be described with references to the accompanying drawings, wherein.

DETAILED DESCRIPTION OF A PREFERRED EMBODIMENT

Figure 1:
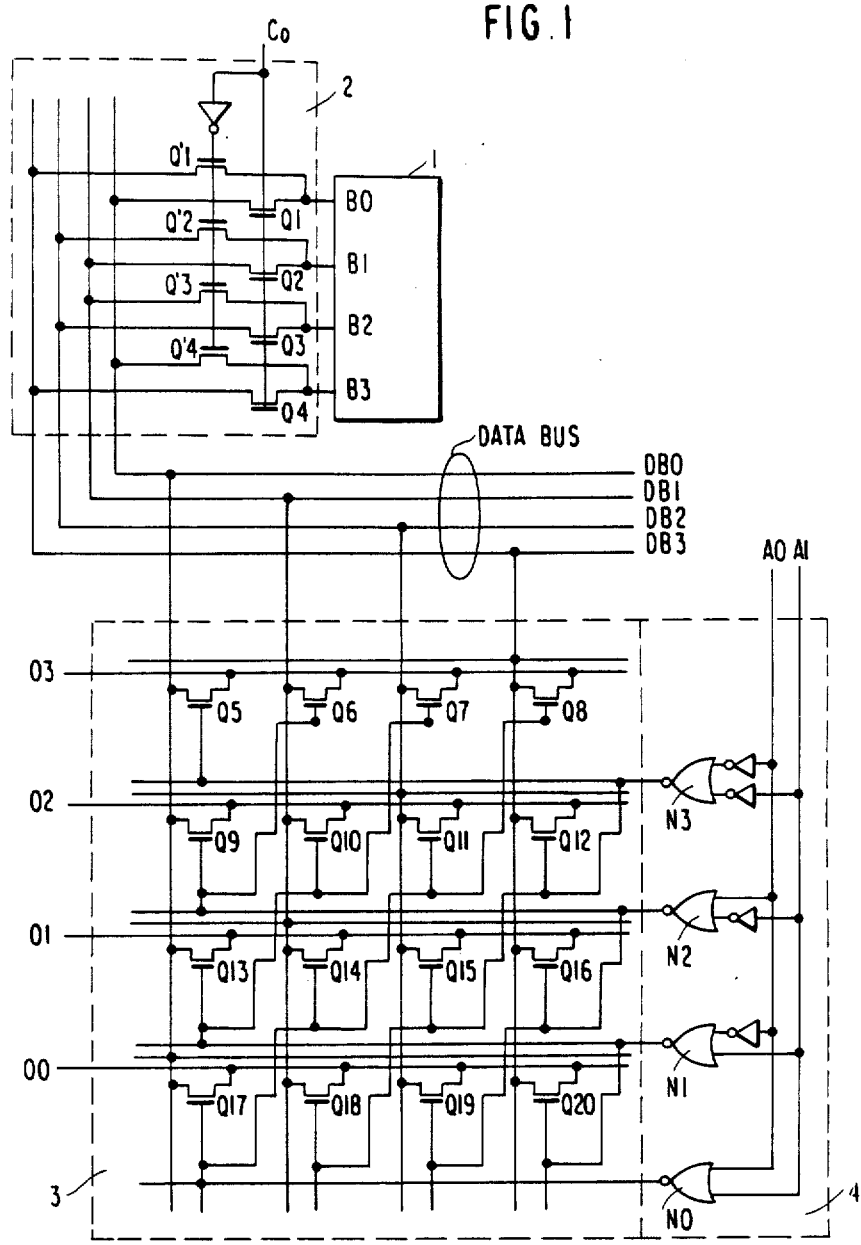
FIG. 1 is a circuit diagram of a data processing circuit having a bit reverse function according to an embodiment of the present invention.

Referring to FIG. 1, a data processing circuit manipulating data with 4 bits B0 to B3 is shown. A register 1 which can store four bits of data B0 to B3 is coupled to a data bus having four signal lines DB0 to DB3 via a bit reverse circuit 2. The data bus is coupled to an input end of a shifting circuit 3. In detail, the signal lines DB0 to DB3 are coupled to input terminals I0 to I3, respectively. Data with a reversed bit string are derived from output terminals O0 to O3 of the shifting circuit 3.

The bit reverse circuit 2 has a first group of switching transistors $Q_1$ to $Q_4$ and a second group of switching transistors $Q'_1$ to $Q'_4$. The first group of transistors $Q_1$ to $Q_4$ are turned on at the same time in response to a control signal $C_0$, while the second group of transistors $Q'_1$ to $Q'_4$ are turned on at the same time in response to an inverted control signal $\overline{C}_0$. That is, the two groups of transistors are never turned on at the same time. The transistors $Q_1$ to $Q_4$ are connected to the signal lines DB0 to DB3, respectively, while the transistors $Q'_1$ to $Q'_4$ are connected to the signal lines DB3 to DB0, respectively. Thus, when the first group of transistors $Q_1$ to $Q_4$ is selected, bits B0 to B3 of data stored in the register 1 are transferred directly to the signal lines DB0 to DB3, respectively. On the other hand, when the second group of transistors $Q'_1$ to $Q'_4$ is selected, the bits B3 to B0 are transferred to the signal lines DB0 to DB3, respectively, In the latter case, data having a reversed bit string (B3, B2, B1, B0) is transferred to the bus.

As described above, a full bit string of data in the register 1 is reversed by the bit reverse circuit 2. Further when the bit reverse circuit 2 is employed for a part of a bit string, a fixed part of the bit string may be reversed. However, the bit reverse circuit 2 cannot reverse a variable part of the bit string of the data in the register 1. Therefore, to obtain the data in which required bits of the bit string are selectively reversed or in which the order of the bit string is changed arbitrarily, the shifting circuit 3 is provided.

The shifting circuit 3 has a plurality of switching transistors (16 transistors $Q_5$ to $Q_{20}$ in this embodiment) arranged in a matrix shape. The transistors $Q_5$, $Q_9$, $Q_{13}$ and $Q_{17}$ are coupled in common to the signal line DB0 via the input terminal $I_0$ at one end. The transistors $Q_6$, $Q_{10}$, $Q_{14}$ and $Q_{18}$ are coupled in common at one end to the signal line DB1 via the input terminal $I_1$. The transistors $Q_7$, $Q_{11}$, $Q_{15}$ and $Q_{19}$ are coupled in common at one end to the signal line DB2 via the input terminal $I_2$. The transistors $Q_8$, $Q_{12}$, $Q_{16}$ and $Q_{20}$ are coupled in common at one end to the signal line DB3 via the input terminal $I_3$. The other ends of the transistors $Q_5$ to $Q_8$ are connected in common to the output terminal O3. The other ends of the transistors $Q_9$ to $Q_{12}$ are connected to the output terminal 02 in common. The other ends of the transistors $Q_{13}$ to $Q_{16}$ are connected in common to the output terminal O1. The other ends of the transistors $Q_{17}$ to $Q_{20}$ are connected in common to the output terminal O0.

The transistor matrix shown in FIG. 1 is divided into four groups: a first group of $Q_5$, $Q_{12}$, $Q_{15}$, and $Q_{18}$; a second group of $Q_6$, $Q_9$, $Q_{16}$, and $Q_{19}$; a third group of $Q_7$, $Q_{10}$, $Q_{13}$, and $Q_{20}$; and a fourth group of $Q_8$, $Q_{11}$, $Q_{14}$, and $Q_{17}$. These four groups are selectively controlled by an output of a decoding circuit 4 receiving data ($A_0$ to $A_1$) representing a shift value. Transistors in the first group are selected and turned on at the same time in response to an output of a NOR gate $N_3$ which generates an active signal when $A_0$ and $A_1$ are both "1", respectively. Transistors in the second group are selected and turned on at the same time in response to an output of a NOR gate $N_2$ which generates an active signal when $A_0$ and $A_1$ are "0" and "1", respectively. Transistors in the third group are selected and turned on at the same time in response to an output of an NOR gate $N_1$ which generates an active signal when $A_0$ and $A_1$ are "1" and "0", respectively. Transistors in the fourth group are selected and turned on in response to an output of a NOR gate $N_O$ which generates an active signal when $A_0$ and $A_1$ are both "0".

The relation between input data and output data of the shifting circuit 3 will be described with respect to Table 1 below.

TABLE 1

| DB0 | DB1 | DB2 | DB3 | $C_0$ | $A_0$ | $A_1$ | 00 | 01 | 02 | 03 |
|-----|-----|-----|-----|-------|-------|-------|----|----|----|----|
| B0  | B1  | B2  | B3  | 1     | 0     | 0     | B0 | B1 | B2 | B3 |
| B0  | B1  | B2  | B3  | 1     | 1     | 0     | B3 | B0 | B1 | B2 |
| B0  | B1  | B2  | B3  | 1     | 0     | 1     | B2 | B3 | B0 | B1 |
| B0  | B1  | B2  | B3  | 1     | 1     | 1     | B1 | B2 | B3 | B0 |
| B3  | B2  | B1  | B0  | 0     | 0     | 0     | B3 | B2 | B1 | B0 |
| B3  | B2  | B1  | B0  | 0     | 1     | 0     | B0 | B3 | B2 | B1 |
| B3  | B2  | B1  | B0  | 0     | 0     | 1     | B1 | B0 | B3 | B2 |
| B3  | B2  | B1  | B0  | 0     | 1     | 1     | B2 | B1 | B0 | B3 |

As shown in Table 1, when the control signal $C_0$ and the $A_0$ and $A_1$ signals all are "0", the data with the full bit reversed string is obtained at the output end of the shifting circuit 3. When the control signal $C_0$ and the $A_0$ and $A_1$ signals are "0", "0", and "1", respectively, the lower 3 bits are reversed. Thus, a full bit string or a part of the bit string can be selectively reversed at a high speed using a small amount of memory.

Further, as shown in Table 1 arbitrary bits can be changed or shifted according to the combination of the $C_0$, $A_0$ and $A_1$ signals. The present invention can also be applied to reversal of data having N bits ($N \geq 2$).

Figure 2:
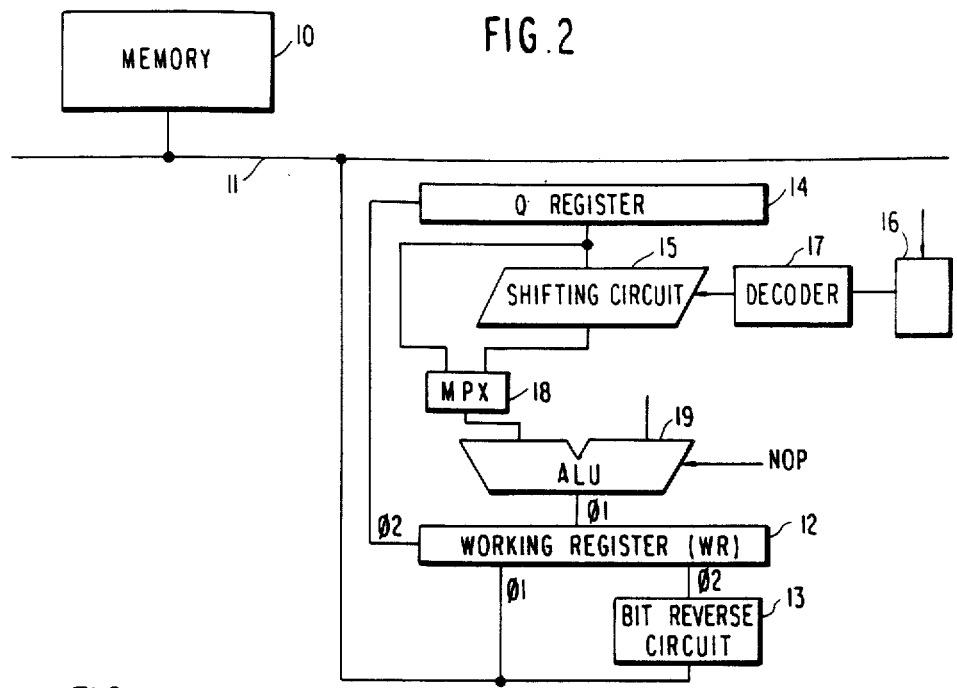
FIG. 2 is a block diagram of a related portion in a signal processor chip having a data processing circuit according to the present invention.

FIG. 2 is a block diagram of a principal part of a signal processor chip. A working register (WR) 12 which stores 55 bits is coupled to a memory 10 which stores a plurality of data to be processed in accordance with an FFT algorithm via a system bus 11. Data to be reversed is read out of the memory 10 and is entered into the working register 12 in response to a clock signal $\phi 1$ shown in FIG. 3.

The data entered into the working register 12 is read out of the register 12 in response to a clock signal $\phi 2$. The bit string of the read out data is reversed fully by a bit reverse circuit 13. Thereafter, the reversed data is restored in the working register 12 in response to the clock signal $\phi 1$. The reversed data is transferred to a Q register 14 in response to the clock signal $\phi 2$. The Q register 14 is coupled to a shifting circuit (a barrel shifter or a lateral shifter) 15. The shifting circuit 15 shifts the data of the Q register 14 in accordance with an output of a decoder 17 which receives data representing a shift value from a register 16 in which the data is preliminarily stored by means of a program control, a key input operation or the like.

The output of the shifting circuit 15, which may be the same circuit as that of FIG. 1, is applied to one input of an arithmetic logic unit (ALU) 19 via a multiplexer 18. At this time, the ALU 19 receives a no operation command (NOP), so that the output of the shifting circuit 15 is entered into the working register 12 as is in response to the clock signal $\phi 1$.

Figure 3:
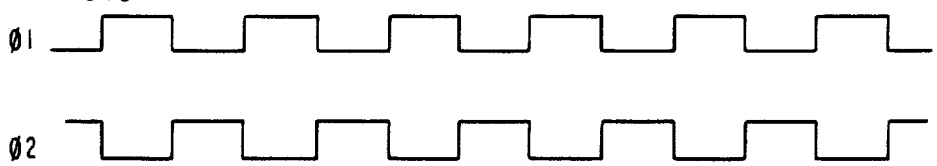
FIG. 3 indicates a timing chart of the data processing circuit in FIG. 2.
Figure 3:
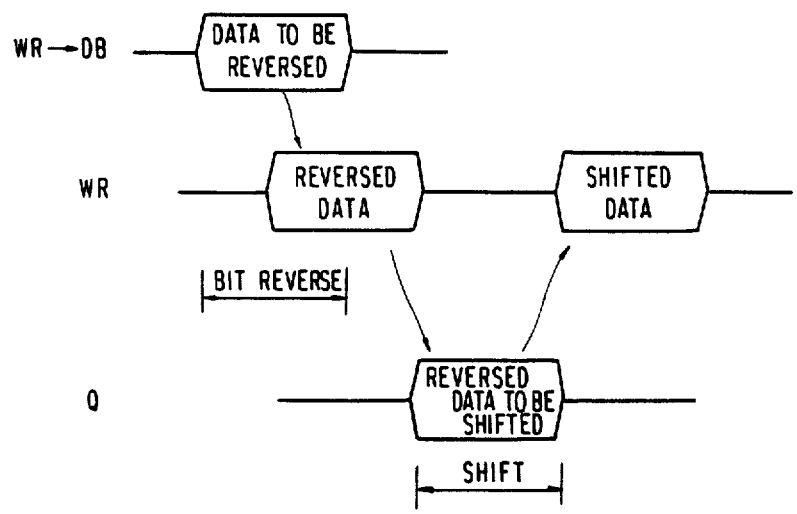

As described above, by providing the shifting circuit 15, the multiplexer 18 and the bit reverse circuit 13 on the signal processor chip a full bit string and a part of a bit string of data used in the FFT operation can be selectively reversed. Further, the reverse operation is performed at high speed as shown in FIG. 3.

What is claimed is:

1. A data processing circuit having a set of data input terminals supplied with input data consisting of a string of bits and a set of data output terminals from which output data is derived, said data processing circuit comprising:

a reverse control circuit, including:

a set of input nodes each coupled to a corresponding one of said data input terminals;

a set of output nodes for outputting reverse control circuit output data; and a control node supplied with a control signal which is variable between a first logic level and a second logic level, said reverse control circuit reversing a full bit string of said input data and outputting reversed data accordingly to said output nodes as said reverse control circuit output data in response to said first logic level of said control signal, and said reverse control circuit outputting said input data to said output nodes as said reverse control circuit output data without reversing any order of said bits of said input data in response to said second logic level of said control signal;

said data processing circuit further comprising a shift circuit, including:

a set of input nodes each coupled to a corresponding one of said output nodes of said reverse control circuit to receive said reverse control circuit output data;

a set of output nodes each coupled to a corresponding one of said data output terminals; and a set of control nodes supplied with control data representative of shift value, said shift circuit shifting said reverse control circuit output data by said shift value represented by said control data and outputting shifted data accordingly to said output nodes of said shift circuit and hence to said data output terminal;

said data processing circuit reversing a full or partial bit string of said input data and producing output data having information representative of the reversed bit string of said input data in response to said first logic level of said control signal, a number of bits of said partial bit string of said input data being determined by said shift value represented by said control data, and said data processing circuit shifting said input data by said shift value represented by said control data and producing output data having information representative of the shifted input data.

2. A data processing circuit having a set of data input terminals supplied with input data consisting of a string of bits and a set of data output terminals from which output data is derived, said data processing circuit comprising:

a reverse control circuit, including:

a set of input nodes each coupled to a corresponding one of said data input terminals;

a set of output nodes for outputting reverse control circuit output data; and a control node supplied with a control signal which is variable between a first logic level and a second logic level, said reverse control circuit reversing a full bit string of said input data and outputting reversed data to said output nodes as said reverse control circuit output data in response to said first logic level of said control signal, said reverse control circuit transferring said input data to said output nodes as said reverse control circuit output data without reversing any order of said bits of said input data in response to said second logic level of said control signal; said reverse control circuit further having:

a first transistor connected between a least significant bit input nodes of said input nodes and a least significant bit output node of said output nodes;

a second transistor connected between a most significant bit input node of said input nodes and a most significant bit output node of said output nodes;

a third transistor connected between said least significant bit input node and said most significant bit output node; and a fourth transistor connected between said most significant bit input node and said least significant bit output node;

said third and fourth transistors being turned ON in response to said first logic level of said control signal, said first and second transistors being turned ON in response to said second logic level of said control signal;

said data processing circuit further comprising a shift circuit, including:

a set of input nodes each coupled to a corresponding one of said output nodes of said reverse control circuit;

a set of output nodes each coupled to a corresponding one of said data output terminals; and a set of control nodes supplied with control data representative of shift value, said shift circuit shifting data derived from said reverse control circuit by said shift value represented by said control data and outputting shifted data to said output nodes of said shift circuit;

said data processing circuit reversing a full or partial bit string of said input data and producing output data having information representative of the reversed bit string of said input data in response to said first logic level of said control signal, a number of bits of said partial bit string of said input data being determined by said shift value represented by said control data, and said data processing circuit shifting said input data by said shift value represented by said control data and producing output data having information representative of the shifted input data.

3. The data processing circuit as claimed in claim 2, wherein said shift circuit cyclically shifts said data derived from said reverse control circuit by said shift value represented by said control data.

4. The data processing circuit as claimed in claim 3, wherein said shift circuit further includes:

a plurality of first lines each connected to a corresponding one of said input nodes;

a plurality of second lines each connected to a corresponding one of said output nodes;

a plurality of switching transistors arranged in a matrix; and a decoder receiving said control data, each of said switching transistors being connected between one of said first lines and one of said second lines, said switching transistors being divided into a plurality of groups, said decoder selecting one of said groups in response to said control data and turning ON the switching transistors in the selected group.

* * * * *